Nov. 6, 1923.  1,473,086
A. C. DAVIDSON
METHOD OF MANUFACTURING CUTTERS
Filed Oct. 30, 1919
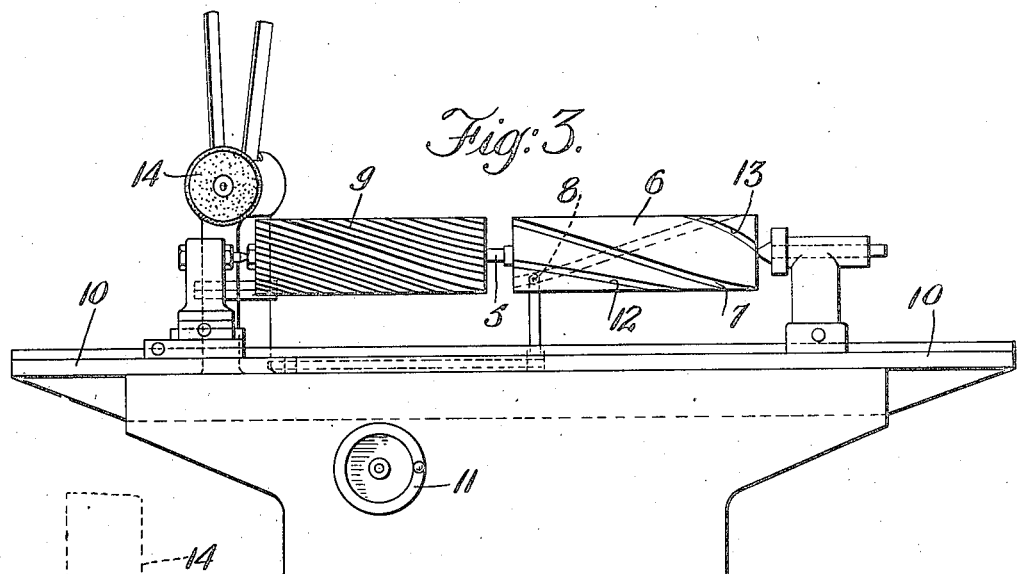
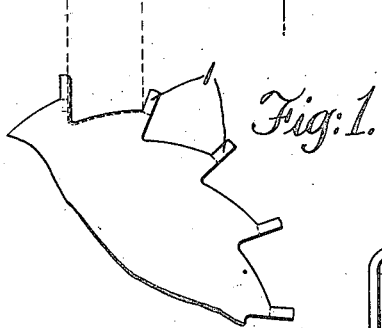
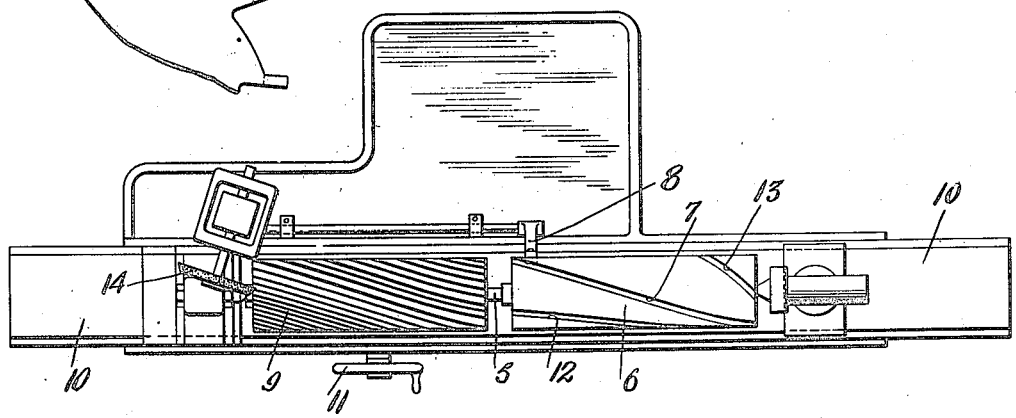
Inventor
Arthur C. Davidson,
By J. P. Wooster.
Attorney

Patented Nov. 6, 1923.

1,473,086

UNITED STATES PATENT OFFICE.

ARTHUR C. DAVIDSON, OF BRONXVILLE, NEW YORK, ASSIGNOR TO D. CO., INC., OF NEW YORK, N. Y., A CORPORATION OF NEW YORK.

METHOD OF MANUFACTURING CUTTERS.

Application filed October 30, 1919. Serial No. 334,437.

*To all whom it may concern:*

Be it known that I, ARTHUR C. DAVIDSON, a citizen of the United States, and resident of Bronxville, in the county of Westchester and State of New York, have invented certain new and useful Improvements in Methods of Manufacturing Cutters, of which the following is a specification.

This invention relates to method and apparatus for manufacturing cutters, and has particular reference to cutters made from cast steel, usually known as semi and high speed steel, containing iron alloyed with tungsten, chromium, vanadium, cobalt, zirconium, tantalum, titanium, molybdenum, uranium, etc.

The present method of manufacturing cutters, such as countersinks, reamers, milling cutters, special circular and flat form tools, end mills, is to first cast an ingot, which is then cropped to removed the pipe, then forged, rolled or hammered and annealed until brought down to the desired section and texture, when the ends are cropped off, then the piece is cut up into sections and the cutters machined from these sections. This is an expensive and laborious process and involves much waste of expensive alloy steel, due to the cropping, scaling and waste in annealing, rolling, forging and machining, as well as losses liable to occur at any time up to the final hardening of the finished cutter, due to cracks, strains, checks, overheating, underheating, improper heat treatment, etc. By this invention I cast cutters in practically finished form in sand molds, preferably made by molding machines, in such manner that exact reproductions of the pattern are made; and only remaining to be finished by grinding the cutting edges and clearances, the remainder of the cutter being within .015 inch of the size desired and ordinarily requiring only to be sand-blasted to remove the scale. By this process, an enormous amount of waste steel is saved, output is increased and all machining operations except boring the centers of milling cutters, etc., are eliminated in favor of grinding, it now being possible to cast high-speed steel so close to finished size as to only require the removal of .015 inch to produce a cutting tool finished all over. In the case of tools to have ground cutter edges, such as countersinks, drills, milling cutters, circular, flat and other form tools, end mills and spiral cutters of all kinds, it is practically impossible in quantity foundry production to wholly eliminate dirt from the molds and to absolutely insure that the metal will always be poured at such temperature as to provide a good body on all cutting edges. To meet these practical conditions inseparable from day to day commercial operations, I have found that the percentage of losses due to dirt from the molds or pouring at too low a temperature is largely reduced by providing the pattern with extensions or ribs on all cutting edges, into which the metal will flow and carry with it any loose dirt in the mold, and also insuring that there will be solid metal at and back of all cutting edges. These extension ribs will readily be ground off in finishing the casting and have been found to localize irregularities, so that the body of the casting and especially all of the portions which are to be finished into cutting edges are solid and homogeneous. It is a simple matter to grind these lips off and thereby leave solid cutting edges.

A further feature of the invention resides in the method for finishing cutters having straight or spiral flutes or channels by grinding, using grinding wheels of cross section conforming to the flute to be ground, whereby there is only a very slight amount of material to be removed, and a very large increase in output is obtained by reason of the reduction in labor required. The invention is applicable to cutting tools of various kinds other than milling cutters, drills, countersinks, reamers, etc., and the illustrations herein are intended to exemplify the salient features of the invention without limiting the scope and application thereof.

Fig. 1 is a view of a portion of a milling cutter embodying the invention. This same figure also represents a section of a portion of the pattern used in casting the blank.

Fig. 2 shows a section of an edged tool such as a drill, tap or reamer, embodying the invention. This same figure also represents a section of the pattern used in casting the blank.

Fig. 3 shows the manner of grinding to finish the flutes of a spiral milling cutter.

Fig. 4 is a plan view.

The first step in the process is the making of a pattern, such as shown in Fig. 1, which will preferably be made in two halves. This pattern is preferably put in the flask on a molding machine which is driven by power so as to mechanically ram the sand very firmly and evenly, as it has been found that hand ramming does not produce as hard a mold nor as even. The pattern can be drawn out of the sand with little or no rapping, and the other half is then made in the machine in the same manner. In the case of a disk type of milling cutter, such as shown in Fig. 1, the pattern is divided transversely of the axis.

An important feature of the invention which is embodied in the pattern, as well as in the finished casting, consists in providing lips 1 (see Fig. 1) which constitute extensions of all cutting edges, the thickness of these lips being about the thickness of the "land" or clearance which is to be ground on the cutter, and the length being from 1/64 to 3/8 inch or more, depending upon the particular tool being cast, the width of these lips, of course, being equal to that of the cutter. By land or clearance is meant that portion of the sloping surface of the tooth immediately adjacent the cutting edge thereof. The land or clearance may be a small arc of a circle concentric with the center of the cutter or it may be a plane almost tangential to the circumference of the cutter. In the case of milling cutters these lips will also be provided on one or both sides or ends, depending on the cutting surfaces to be finished. Other surfaces which are to be only slightly finished or not at all, can be cast as stated within .015 inch, so that little or no material remains to be removed other than from the cutting surfaces. The center holes can also be cast within .015 inch and ground to finish, but on account of so many milling cutters being provided with keyways, the center may be solid and bored out, although it is entirely possible to grind the center hole without any boring.

The function of the lips is not only to insure that there will be solid metal at all the cutting edges, but the lip recesses in the mold furnish spaces in which loose dirt will be carried by the metal so that it is insured that solid metal remains at the finished cutting edges.

After lips are ground off and the center hole finished, the cutter can be put on an arbor for finishing the flutes. In carrying this out with either straight or spiral cutters, or for taps, form tools, drills and reamers, a grinding wheel is used having a cross-section of the particular flute to be ground, and the blank is traversed back and forth on a carriage. Hardly more material is required to be removed than the grit and sand on the surface, it being of course understood that the proper angle of clearance is cast and ground on the faces of the teeth or flutes, as the case may be.

In the case of spiral cutters, the grinding wheel is set at the proper tangent to the flute of cutter, as shown in Fig. 4, and the cutter arbor 5 carries the cam 6, having a spiral slot 7, which is engaged by a pin 8, so as to revolve both the cam 6 and cutter blank 9 as the grinder carriage 10 is reciprocated by the hand wheel 11. The cam 6 is provided with a plurality of slots of different pitches, such as 12, 13, and can be detached from the arbor 5 to be replaced by others, so as to permit a wide range of flexibility in the work to be finished on the same machine. 14 is the grinder wheel, as shown in dotted lines in Fig. 1, working on one of the flutes of the cutter, it being seen that the plane face of the grinder finishes the face of the tooth while the rounded edge of the grinder finishes the bottom of the flute with any desired contour, this usually being rounded to provide a fillet at the bottom of the flute. For cutters doing heavy work, the tooth can be backed up by more material, because the surface of this backing need not be finished, inasmuch as the lips provided on the casting when removed leave sufficient clearance so that the formation of the tooth behind this clearance, and between it and the bottom of the flute, becomes immaterial. Thus teeth can be designed in the pattern, with straight backs where the work is not heavy, or with curved or angular backs, to suit the work to be performed, without additional labor. If the back is angular, the part immediately behind the clearance need not be finished, as one operation with the proper shape of grinder will finish the flute and the face of the tooth, but if it is desired to finish the entire angular back of the tooth, this car be done by a special shape of grinder, or in another operation. As a general practice it is unnecessary to finish the backs of teeth, or even bottoms of the flutes, the only necessity being to finish the faces of teeth or flutes at the proper angle to a keen cutting edge.

By the foregoing novel method cutter is produced from any desired analysis of steel, at a fraction of the cost heretofore required for machining such cutters from solid stock, and requiring a very simple layout of grinding machinery for finishing an increased output. In the case of some special analyses, cutters are produced which are unmachinable by ordinary methods and can only be commercially produced in quantity by the method of this invention. The castings are ordinarily cleaned of sand, then rough finished, say to within 1/64 inch of size, then heat treated according to usual practice, and then finished by grinding to exact size. In performance they are the best tools, and can be produced at a fraction of the cost, not only in standard or stock sizes, but in special, large or irregular sizes and shapes, at a great advantage in time and cost as compared with previous practice.

The drawings attached hereto are for purposes of illustration and not limitation of the invention except as required by the appended claims.

What I claim is:

1. The method of making a spiral fluted cutting tool consisting in casting the tool with projecting spiral ribs extending beyond the cutting edges, finishing the flutes by grinding to the contour of an abrading tool and removing said projecting ribs.

2. The method of insuring sound metal at the cutting edges of a milling cutter or the like consisting in casting the same substantially to size in a mold with projecting lips at the cutting portions and grinding away said lips.

3. The method of making a cutting tool consisting in casting the body of the tool with projecting lips on the portions to have cutting edges and finishing by removing said lips.

4. The method of making a cutting tool consisting in casting the body of the tool with projecting lips on the portions to have cutting edges and finishing the cutting edges by grinding away said lips.

5. The method of making a fluted cutting tool consisting in casting the tool substantially to size with lips projecting from cutting portions, and finishing the cutting portions and the flutes by grinding.

6. The method of making a fluted cutting tool consisting in casting the tool substantially to size with projecting portions extending beyond the cutting edges, finishing the cutting edges, and finishing the flutes by grinding to a predetermined shape.

7. The method of making a spiral fluted cutting tool consisting in casting the tool substantially to size with projecting portions extending beyond the cutting edges, finishing the cutting edges, and finishing the flutes by grinding to the contour of a cutting tool while reciprocating the blank and automatically turning the same to coincide with the lead.

8. The method of making a fluted or toothed cutting tool consisting in casting same substantially to size with lips projecting from the cutting edges, grinding away the lips to finish the cutting edges, and shaping the flutes or tooth backs to the contour of a cutting tool.

9. The method of making a form cutting tool such as a milling cutter or the like consisting in casting same in a packed sand mold substantially to size with lips projecting from the cutting edges, and finishing the tool by grinding away said lips.

10. A cast cutting tool blank having lips cast on the cutting edges, and adapted to be removed by grinding in finishing the tool.

11. A cast steel cutting tool blank having lips cast to extend outwardly of the cutting edge portions.

12. A cast steel cutting tool blank having lips cast to extend outwardly of the cutting edge portions and of about the thickness of the clearances or lands.

13. A cast steel milling cutter blank having lips extending outwardly from each tooth whereby to insure solid metal in the cutting edge of each tooth and adapted to be removed by grinding in finishing the tool.

14. A cast steel high speed alloy cutter blank provided with a lip on its cutting edge portion, said lip being about the thickness of the clearance to be ground on the cutter.

15. A cast steel high speed alloy cutter blank provided with a cutting edge portion and a lip on said edge portion, said lip being of a size adapted to contain any impurities from the mold used in casting the blank.

16. A cast steel high speed alloy cutter blank provided with a lip on its cutting edge portion, said lip being about the thickness of the clearance to be ground on the cutter of substantially the full width of the cutting edge portion and about 1/64th to 3/8th of an inch in length.

17. A high speed alloy steel casting blank for a cutter provided with a lip cast on to a cutting edge portion, said lip being of lower quality steel than said cutting edge portion.

18. The process of making a high speed alloy cast steel cutter which comprises casting the cutter to substantially its finished dimensions except along a cutting edge portion, and forming a lip on said cutting edge portion of a size adapted to take up the impurities in said mold and leave said edge portion of good quality metal, and removing said lip from said edge portion.

Signed at the city of New York, in the county of New York and State of New York, this 24th day of October, A. D. 1919.

ARTHUR C. DAVIDSON.